Patented July 24, 1928.

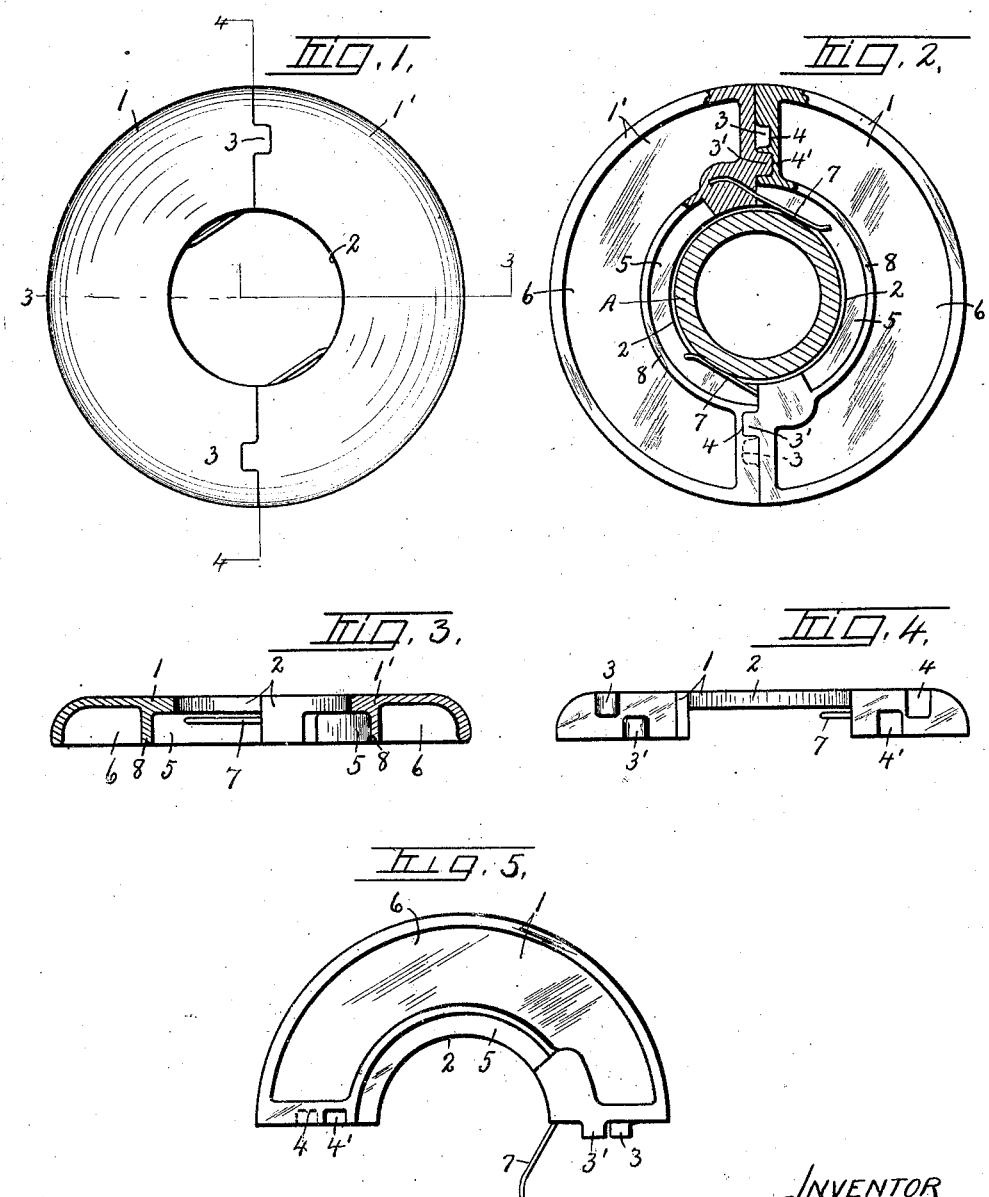

1,678,388

UNITED STATES PATENT OFFICE.

JOSEPH B. HOLDEN, OF CANASTOTA, NEW YORK.

COMBINATION FLOOR AND CEILING PLATE.

Application filed October 4, 1927. Serial No. 223,908.

This invention relates to a combination floor and ceiling plate adapted to be placed by hand around and upon a pipe or other cylindrical object to impart a more or less ornamental and pleasing appearance to the pipe at its junction with the floor or ceiling against which it is adapted to abut.

The main object is to construct the floor plate in sections and to provide the sections with means for frictionally engaging the periphery of the pipe for holding them in operative position and permitting their free adjustment or removal when desired.

Another object is to provide the meeting edges of the plate sections with means for holding them against relative axial movement when adjusted for use upon the pipe.

A further object is to construct the sections so that both may be cast from plastic material in one and the same mold so that any one section may be used with any other section or interchanged one for another.

Other objects and uses will be brought out in the following description.

In the drawings:—

Figure 1 is a face view of a floor or ceiling plate embodying the various features of my invention.

Figure 2 is a reverse face view, partly in section, of the same plate operatively mounted upon a pipe.

Figure 3 is a transverse sectional view taken on line 3—3, Figure 1.

Figure 4 is an inner face view of one of the detached sections of the plate.

Figure 5 is an inverted plan of the section shown in Figure 4.

As illustrated, this plate is composed of two similar sections —1— and —1'—, each of which is substantially semi-circular and provided with a semi-circular recess —2— concentric with the axis of the plate and corresponding in radius to the radius of the pipe or other cylindrical object with which it is to be used or upon which it is to be placed.

The meeting edges of the sections are mainly flat and disposed in the same diametrical plane or radial to the axis except that they are provided at one side of their centers with relatively short circumferentially extending lugs —3— and —3'— and at their opposite side with corresponding recesses —4— and —4'—, the lugs —3— and —3'—
and recesses —4— and —4'— being arranged in staggered relation axially as shown more clearly in Figure 4.

That is, the lugs —3— and —3'— are arranged in different planes and at different distances from the center or axis of the plate while the recesses —4— and —4'— are also arranged in different planes and at different distances from the center or axis of the plate and preferably open through opposite faces of the plate to facilitate molding, the lug —3— and its corresponding recess —4— being equal distances from the axis while the lug —3'— and its corresponding recess —4'— are also equal distances from the axis so that when any two sections are brought together edge to edge the lugs —3— and —3'— of one section will enter the corresponding recesses —4— and —4'— respectively of the other section.

Each section which forms a unitary article of manufacture in the same mold and duplicated for use in pairs, is provided with inner and outer approximately semi-circular recesses —5— and —6— open at one side but closed at the opposite side by relatively thin walls so as to give it a finished external appearance.

One of the objects in forming the recesses —5— and —6— is to reduce the weight of the plate and thereby to reduce the amount of material required for its formation.

The inner recess, however, has another object, namely, to receive the free ends of wire or equivalent springs —7— having their other ends secured to one end of the inner flanges as —8— separating the chambers —5— and —6—.

The spring —7— extends circumferentially some distance beyond a plane extending diametrically across the inner edge of the section so that its free end is normally disposed a distance from the center or axis of the plate less than the radius of the inner semi-circular edge of said plate so that when the two plates are assembled edge to edge in the manner shown in Figures 1 and 2 and also in Figure 3 and the lugs —3— and —3'— are engaged in their respective recesses —4— and —4'— the free ends of the springs will frictionally engage the periphery of the pipe as —A— upon which the plate is mounted for holding said plate in operative position upon the pipe.

That is, the free end of each spring of each section will engage the periphery of the pipe some distance beyond the plane of the meeting edges of the plates which means that the distance between the normal position of the free edge of the spring and opposite inner corner of the same plate will be less than the external diameter of the pipe as shown more clearly in Figure 5.

It, therefore, follows that when the two sections of the plate are assembled upon the pipe the free ends of the springs —7— will engage diametrically opposite outer faces of the pipe some distance beyond the meeting faces of their respective sections.

One end of the recess —5— at which spring —7— is located is closed or thickened the full depth of the recess to permit the adjacent end of the spring to be incorporated therein when the plate section is cast or molded, the other end of said recess —5— being left open to receive the free end of the spring of the companion plate section as shown in Figure 2.

It will also be observed that both ends of the recess —6— are closed and made of substantially the entire thickness of the section to permit the formation of the recesses —4— and —4'— in one side and the formation of the lugs —3— and —3'— in the opposite sides.

Aside from the formation of the lugs —3— and —3'— and recesses —4— and —4'— the inner faces of opposite ends of the plate section are substantially flat and radial to permit the inner faces of the opposed sections to abut flatwise against each other in a plane extending through the axis of the plate and pipe upon which it is mounted.

It will be evident from the foregoing description that the opposite half sections of the plate are identical and may, therefore, be made in one and the same mold.

These plate sections are preferably made of bakelite which in a plastice state is readily moldable in suitable dies under pressure to impart to the section the desired form, strength and durability and also permits the plates to be used for insulating purposes where required.

In view of the fact that the sections forming the plates are identical and made in the same mold it is obvious that any two of the sections may be selected at random to form the desired floor, wall or ceiling plate around the pipe as —A— and that in applying the sections to the pipe it is simply necessary to bring them together around and against opposite sides of the pipes with their lugs —3— and —3'— engaging in their respective recesses —4— and —4'— during which operation the free ends of the springs —7— will be pressed against opposite faces of the pipe with a more or less sliding motion tangentially thereto thereby frictionally holding or locking the sections upon the pipe and at the same time yieldingly holding the sections in engagement with each other by reason of the fact that the spring of each section engages the periphery of the pipe beyond the abutting edges thereof so that the contact points of the springs of both sections with the pipe will be at opposite sides of the abutting faces of the sections.

Under these conditions the sections can be locked to each other only when the springs —7— are actually engaged with the periphery of the pipe in the manner just described, it being understood that for convenience of assembly the free ends of the springs are bent outwardly thus permitting them to ride tangentially across the periphery of the pipe when the opposed sections are brought together around the pipe.

If, for any reason, it should be desired to remove the sections from the pipe after having been assembled thereon it is simply necessary to withdraw one or both of the sections laterally with sufficient force to overcome the tension of the springs against the pipe.

What I claim is:—

1. A floor or wall plate composed of half sections identical in construction and adapted to be placed around and upon a pipe, each section having a yielding member adapted to frictionally engage the periphery of the pipe when the sections are assembled thereon, each section having one of its end faces provided with a plurality of lugs in different planes at right angles to the axis of the plate and its other end face provided with a corresponding number of recesses complementary to the lugs and in different planes corresponding to the planes of the lugs, each lug and its corresponding recess in the same plane being equal distances from said axis.

2. A floor or wall plate composed of half sections arranged in opposed relation, the end of one section and opposite end of the other section being provided with springs projecting therefrom in opposite directions for frictionally engaging an object around which the plate is placed for frictionally holding the plate in operative position on said object, each section having one of its end faces provided with a plurality of lugs in different planes at right angles to the axis of the plane and its other end face provided with a corresponding number of recesses complementary to the lugs and in different planes corresponding to the planes of the lug, each lug and its corresponding recess in the same plane being equal distances from said axis, said lugs and their corresponding recesses being arranged in staggered relation lengthwise of said axis.

3. A floor or wall plate composed of opposite half sections, identical in construction, each section having a substantially semi-circular groove in its inner face closed at one end and open at its opposite end, the closed end of the groove of one section being adjacent the open end of the groove of the other section when the sections are assembled, and springs each having one end incorporated in the closed end of the groove of one section and its other end projecting into the open end of the groove of the other section when the sections are brought together end to end.

4. A floor or wall plate composed of half sections identical in construction and adapted to be placed around a pipe or analogous object, each section having one of its end faces provided with a plurality of lugs in different planes at right angles to the axis of the plate and its other end face provided with a corresponding number of recesses complementary to the lugs and in different planes corresponding to the planes of the lugs, each lug and its corresponding recess in the same plane being equal distances from said axis.

5. A floor or wall plate composed of half sections identical in construction and adapted to be placed around a pipe or analogous object, each section having one of its end faces provided with a plurality of lugs in different planes at right angles to the axis of the plate and its other end face provided with a corresponding number of recesses complementary to the lugs and in different planes corresponding to the planes of the lugs, each lug and its corresponding recess in the same plane being equal distances from said axis, said lugs and their corresponding recesses being arranged in staggered relation lengthwise of said axis.

In witness whereof I have hereunto set my hand this 22 day of September, 1927.

JOSEPH B. HOLDEN.